(12) United States Patent
Cheng et al.

(10) Patent No.: US 8,073,505 B2
(45) Date of Patent: Dec. 6, 2011

(54) PORTABLE ELECTRONIC APPARATUS WITH DUAL HINGES

(75) Inventors: Ying-Yen Cheng, Tao-Yuan (TW); I-Cheng Chaung, Tao-Yuan (TW)

(73) Assignee: HTC Corporation, Taoyuan, Taoyuan County (TW)

(*) Notice: Subject to any disclaimer, the term of this patent is extended or adjusted under 35 U.S.C. 154(b) by 718 days.

(21) Appl. No.: 12/124,140

(22) Filed: May 20, 2008

(65) Prior Publication Data
US 2009/0061959 A1 Mar. 5, 2009

(30) Foreign Application Priority Data
Aug. 27, 2007 (TW) .............................. 96131672 A

(51) Int. Cl.
*H04M 1/00* (2006.01)
(52) U.S. Cl. .................................................. 455/575.3
(58) Field of Classification Search ................. 455/575.3
See application file for complete search history.

(56) References Cited

U.S. PATENT DOCUMENTS
7,508,411 B2 * 3/2009 Boesen ...................... 348/14.02
2005/0050686 A1 3/2005 Kurokawa FOREIGN PATENT DOCUMENTS
TW 200722643 6/2007
* cited by examiner

*Primary Examiner* — Duc Nguyen
*Assistant Examiner* — Ankur Jain
(74) *Attorney, Agent, or Firm* — Winston Hsu; Scott Margo

(57) ABSTRACT

A portable electronic apparatus includes a first module, a second module, and a first hinge assembly. The first hinge assembly is connected to the first module and the second module. The first hinge assembly includes a first hinge, a second hinge and a first swing member. The first hinge is installed inside the first module and pivotally connected to the first module, and the second hinge is pivotally connected to the second module. The first swing member connected to the first hinge and the second hinge. When the first module and the second module are close, the first module and the second module cover the first hinge assembly together.

11 Claims, 6 Drawing Sheets

PORTABLE ELECTRONIC APPARATUS WITH DUAL HINGES

BACKGROUND OF THE INVENTION

1. Field of the Invention

The present invention relates to a portable electronic apparatus with dual hinges, and more particularly, to a portable electronic apparatus with invisible dual hinges.

2. Description of the Prior Art

In highly developed information communication systems in the modern information society, electronic devices are widely utilized in every area. For instance, the utilization of a convenient and lightweight mobile phone device has become a way of communication in our daily life; users can easily exchange and share information, experience, and opinion through the convenience of the mobile phone device. The mobile phone progressed tremendously in recent years and various types of mobile phones are continuously developed. Together with communication quality, appearance and size-reduction, the ability to provide a user with a more convenient operating environment is also a major concern when designing a mobile phone. The important issue now is how to emplace inner components inside the electronic device efficiently and to keep structural intensity. It is important to install all components in housing stably without interference with one another.

In opening design of the mobile phone in the market, part of the opening design of the mobile phone utilizes a clamshell-type construction. A clamshell mobile phone is divided into two parts. One part contains a display panel and the other part contains a keypad. The two parts are connected with a hinge and other fixing components. Compared with a bar-type mobile phone, the clamshell mobile phone has advantages of a small size in a close status, preventing keypads being triggered inadvertently, and so on. The clamshell mobile phone with an exposed hinge outside a display module and a host module has following disadvantages: reduction of aesthetic outline, fracture of the hinge when dropping the clamshell mobile phone, large fabricating tolerance causing decrease of fabricating precision and large size of the clamshell mobile phone due to height of the hinge. There is a need to design a good opening mechanism of the clamshell mobile phone.

SUMMARY OF THE INVENTION

The claimed invention is to provide a portable electronic apparatus with invisible dual hinges.

According to the claimed invention, a portable electronic apparatus includes a first module, a second module, and a first hinge assembly. The first hinge assembly is connected to the first module and the second module. The first hinge assembly includes a first hinge, a second hinge and a first swing member. The first hinge is installed inside the first module and pivotally connected to the first module, and the second hinge is pivotally connected to the second module. The first swing member connected to the first hinge and the second hinge. When the first module and the second module are close, the first module and the second module cover the first hinge assembly together.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
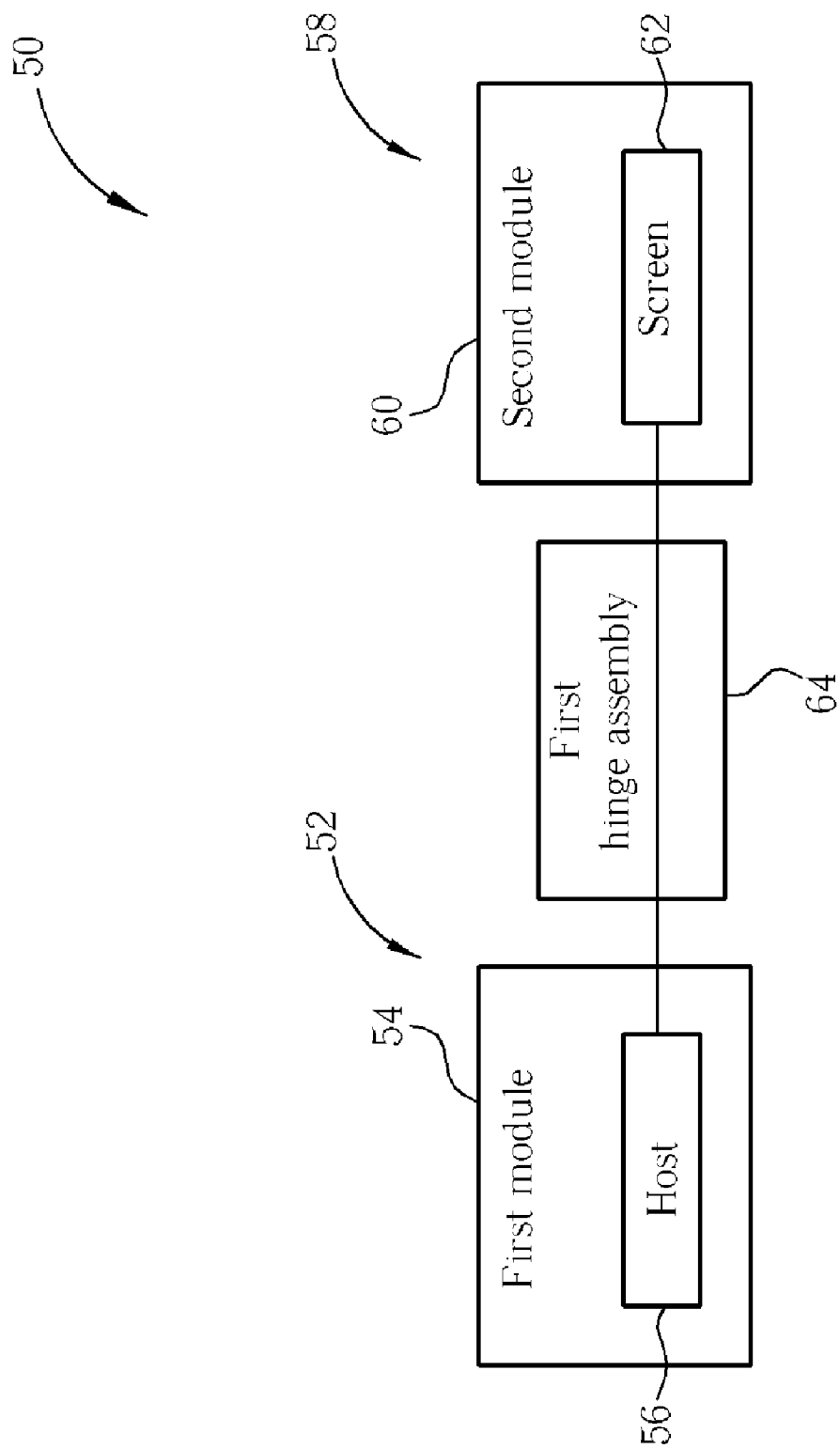
FIG. 1 is a block diagram of a portable electronic apparatus according to a first embodiment of the present invention.

Please refer to FIG. 1. FIG. 1 is a block diagram of a portable electronic apparatus 50 according to a first embodiment of the present invention. The portable electronic apparatus 50 can be a clamshell mobile phone, a notebook computer, an electronic apparatus with two modules and so on. The portable electronic apparatus 50 includes a first module 52, a second module 58, and a first hinge assembly 64. The first module 52 can be a host module, and the second module 58 can be a display module. The first module 52 includes a first housing 54 and a host 56. The first housing 54 is for covering inner components inside the first module 52. The host 56 is installed inside the first housing 54 and is for controlling operation of the portable electronic apparatus 50. The second module 58 includes a second housing 60, and a screen 62 installed inside the second housing 60 and electrically connected to the host 56 for displaying image signals transmitted from the host 56. The first hinge assembly 64 is connected to the first module 52 and the second module 58 so that the second module 58 is capable of rotating relative to the first module 52 to be in an opening condition or in a close condition.

Figure 2:
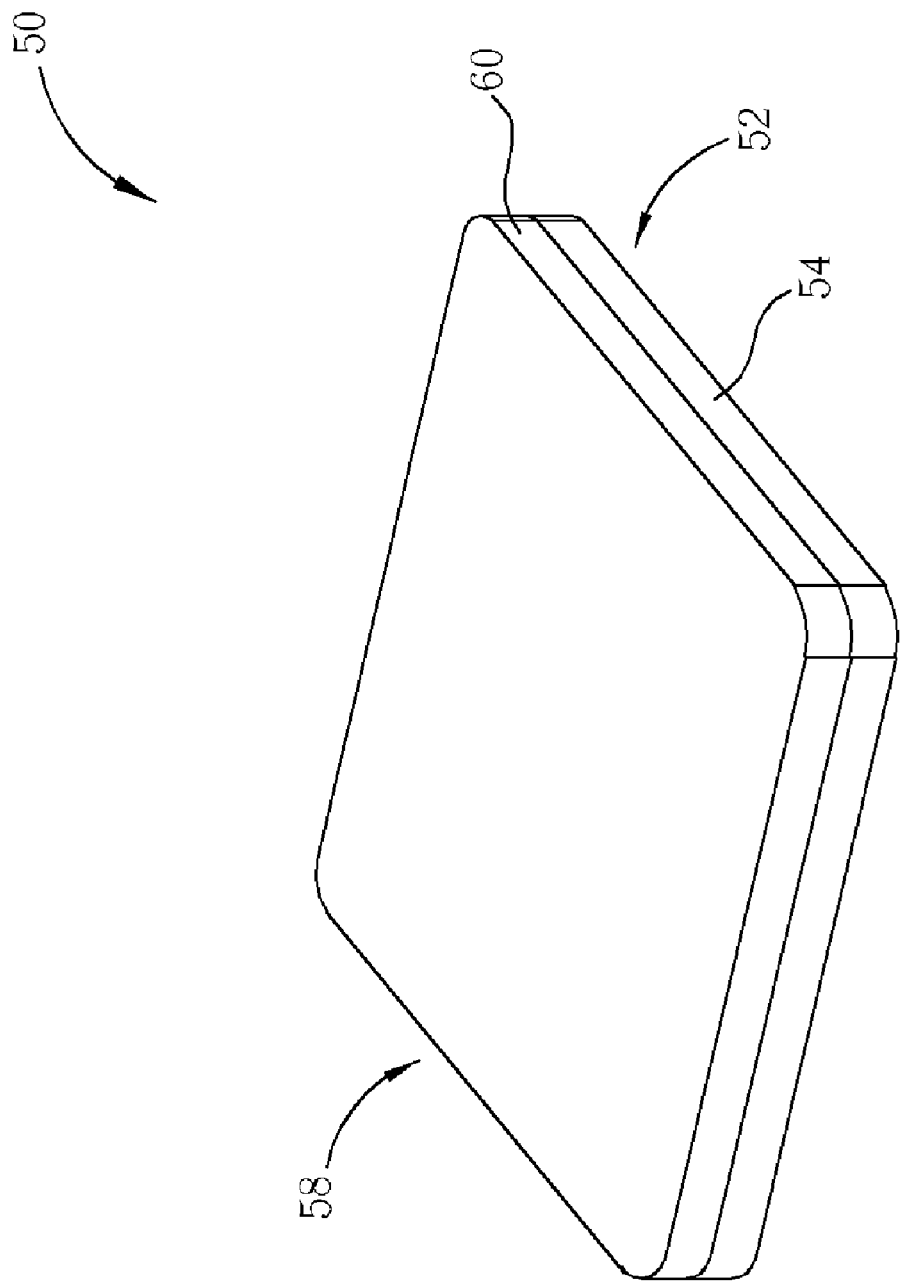
FIG. 2 is a schematic drawing of the portable electronic apparatus in the close condition according to the first embodiment of the present invention.
Figure 3:
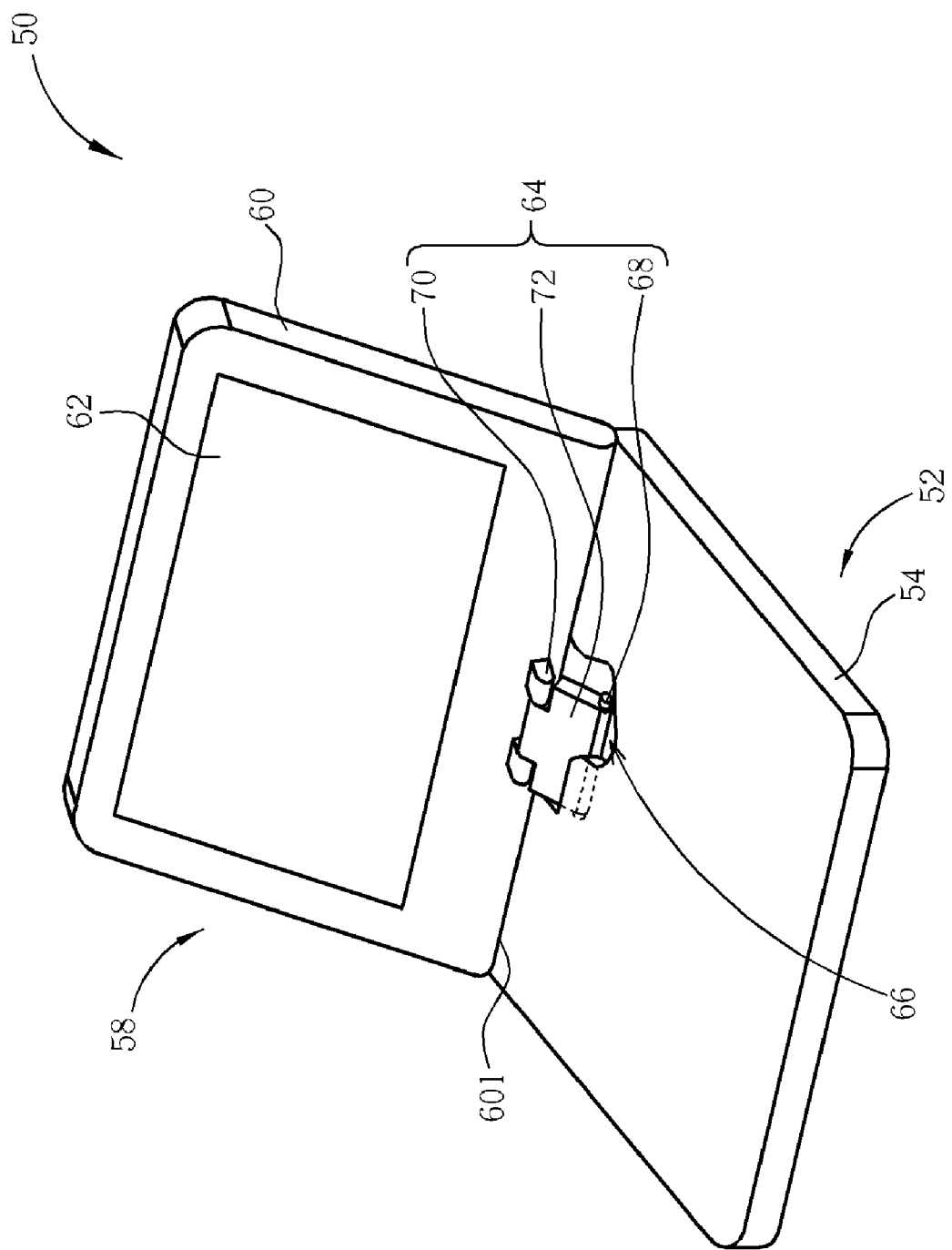
FIG. 3 is a schematic drawing of the portable electronic apparatus in the half-open condition according to the first embodiment of the present invention.
Figure 4:
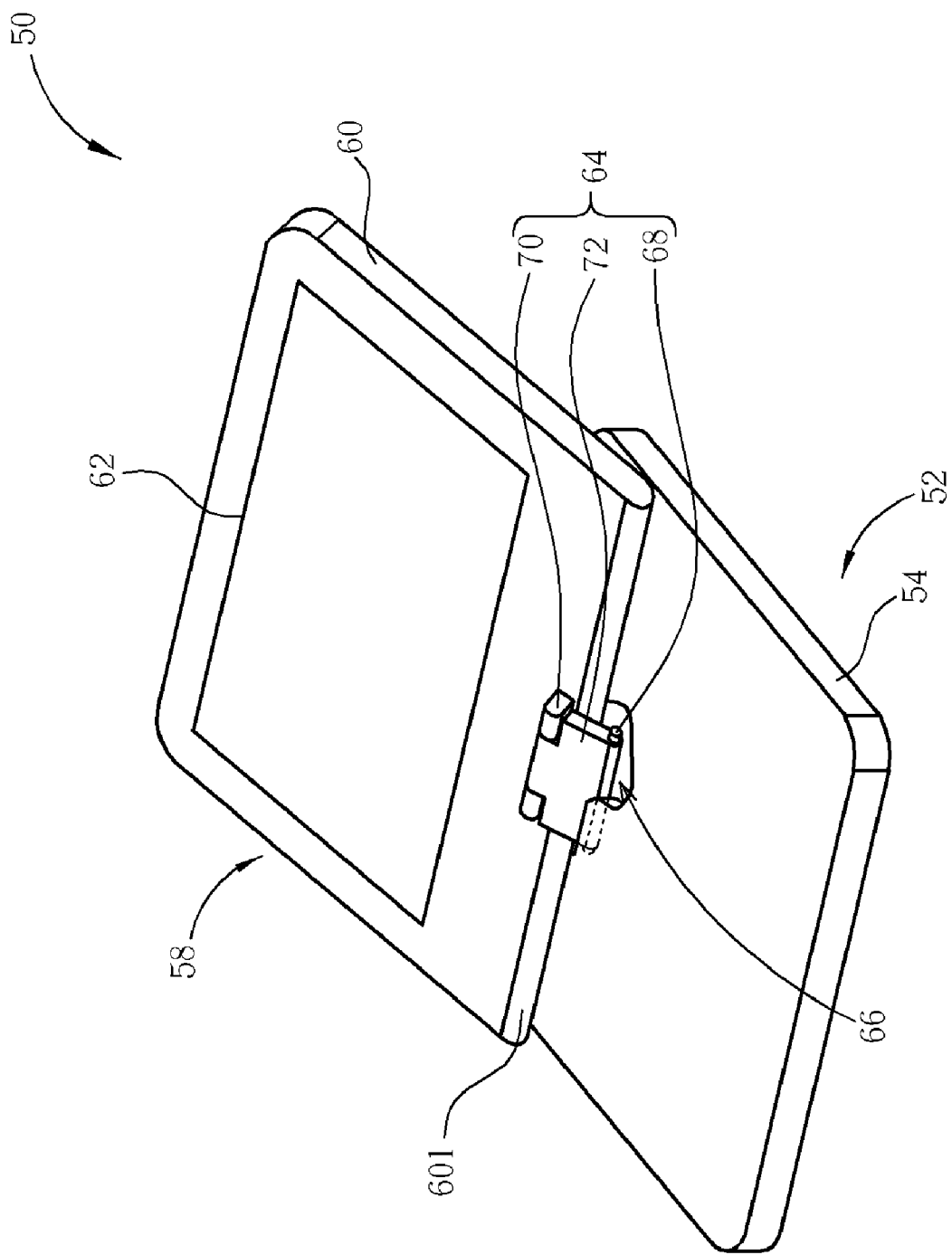
FIG. 4 is a schematic drawing of the portable electronic apparatus in the open condition according to the first embodiment of the present invention.
Figure 5:
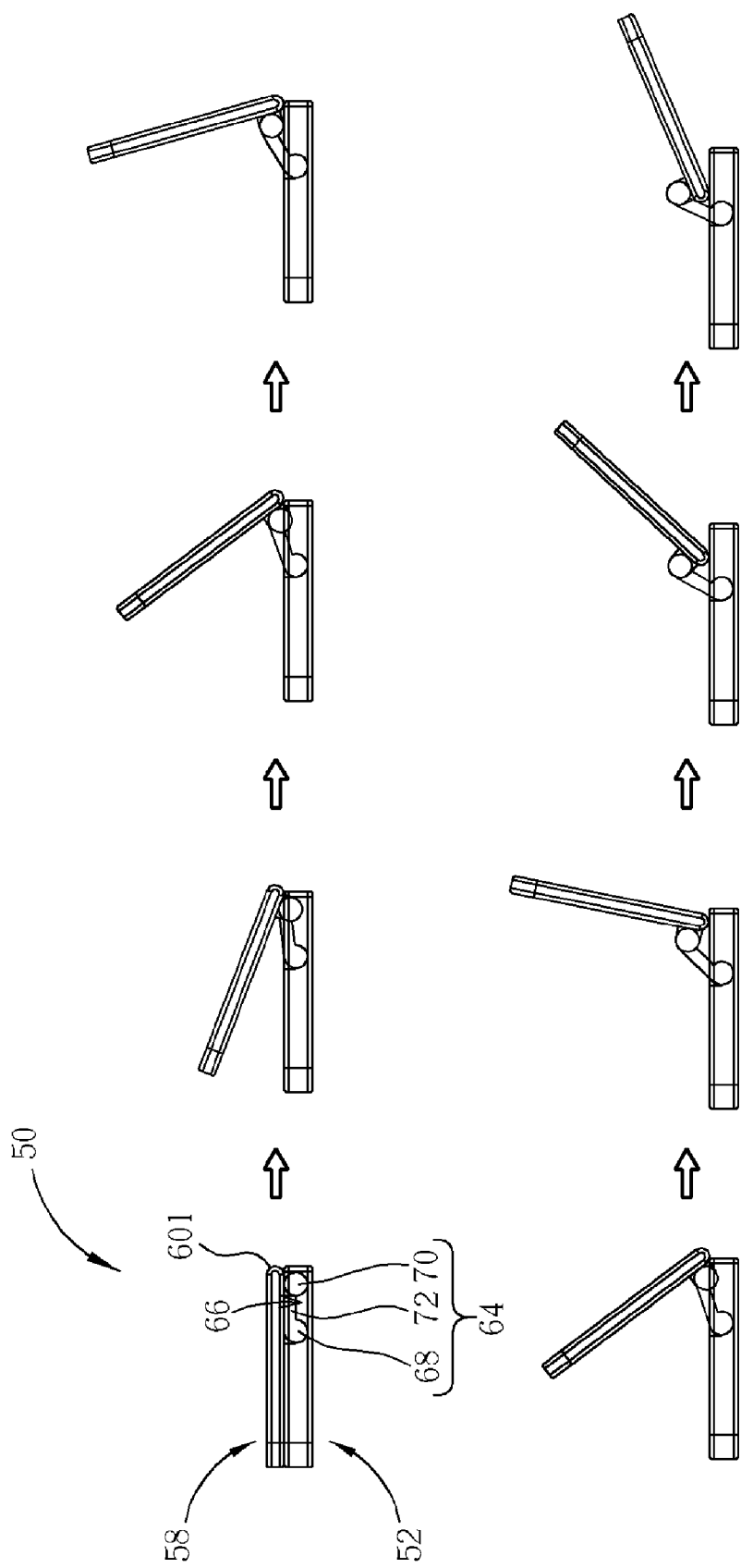
FIG. 5 is a lateral view of folding the portable electronic apparatus according to the first embodiment of the present invention.

Please refer to FIG. 2 to FIG. 5. FIG. 2 is a schematic drawing of the portable electronic apparatus 50 in the close condition according to the first embodiment of the present invention. FIG. 3 is a schematic drawing of the portable electronic apparatus 50 in the half-open condition according to the first embodiment of the present invention. FIG. 4 is a schematic drawing of the portable electronic apparatus 50 in the open condition according to the first embodiment of the present invention. FIG. 5 is a lateral view of folding the portable electronic apparatus 50 according to the first embodiment of the present invention.

Go into detail, the first housing 54 of the first module 52 has a first containing space 66. The first hinge assembly 64 includes a first hinge 68, a second hinge 70, and a first swing member 72. The first hinge 68 is installed inside the first containing space 66 and pivotally connected to the first housing 54. The second hinge 70 is pivotally connected to the second housing 60. The first swing member 72 is connected to the first hinge 68 and the second hinge 70.

As shown in FIG. 2 and FIG. 5, the first assembly 64 is contained inside the first containing space 66 completely when the portable electronic apparatus 50 is in the close condition, that is, the second module 58 and the first module 52 are folded up. At this time, the first hinge assembly 64 can not bee seen from the outline of the portable electronic apparatus 50. The first module 52 and the second module 58 cover the first hinge assembly 64 together. In other words, the first hinge assembly 64 is hidden inside the portable electronic apparatus 50. As shown in FIG. 3 and FIG. 5, when the second module 58 opens with respect to the first module 52, the second module 58 rotates in a clockwise direction relative to the first module 52 and pivots on a first end 601 of the second housing 60 as a fulcrum. The second module 58 drives the first swing member 72 connected to the first hinge 68 to rotate in a counterclockwise direction relative to the first module 52. In this embodiment, the first end 601 of the second housing 60 can be formed as fillet structure so that the second module 58 is capable of rotating relative to the first module 52 smoothly when contacting with the first housing 54 of the first module 52 for preventing interference of fold. When the second module 58 rotates relative to the first module 52, the second hinge 70 and the first swing member 72 are exposed outside the first containing space 66 partly. When the angle between the second module 58 and the first module 52 increases, the exposed part of the second hinge 70 and the first swing member 72 increases. As shown in FIG. 4 and FIG. 5, when the second module 58 opens completely with respect to the first module 52, the second module 58 can rotate to a position parallel to the first module 52 closely without interference with the first module 52 due to the disposition of the second hinge 70. Thus, the mechanism can enlarge a view angle of the second module 58 of the portable electronic apparatus 50. Additionally, the first hinge 68 of the first hinge assembly 64 can be installed inside the second housing 60 and pivotally connected to the second module 58, and the second hinge 70 can be pivotally connected to the first housing 54. The operation is the same as the above-mentioned embodiment. In a word, the first module 52 is a host module, and the second module 58 is a display module in this embodiment. However, the first module 52 also can be a display module, and the second module 58 can be a display module accordingly in another embodiment.

Figure 6:
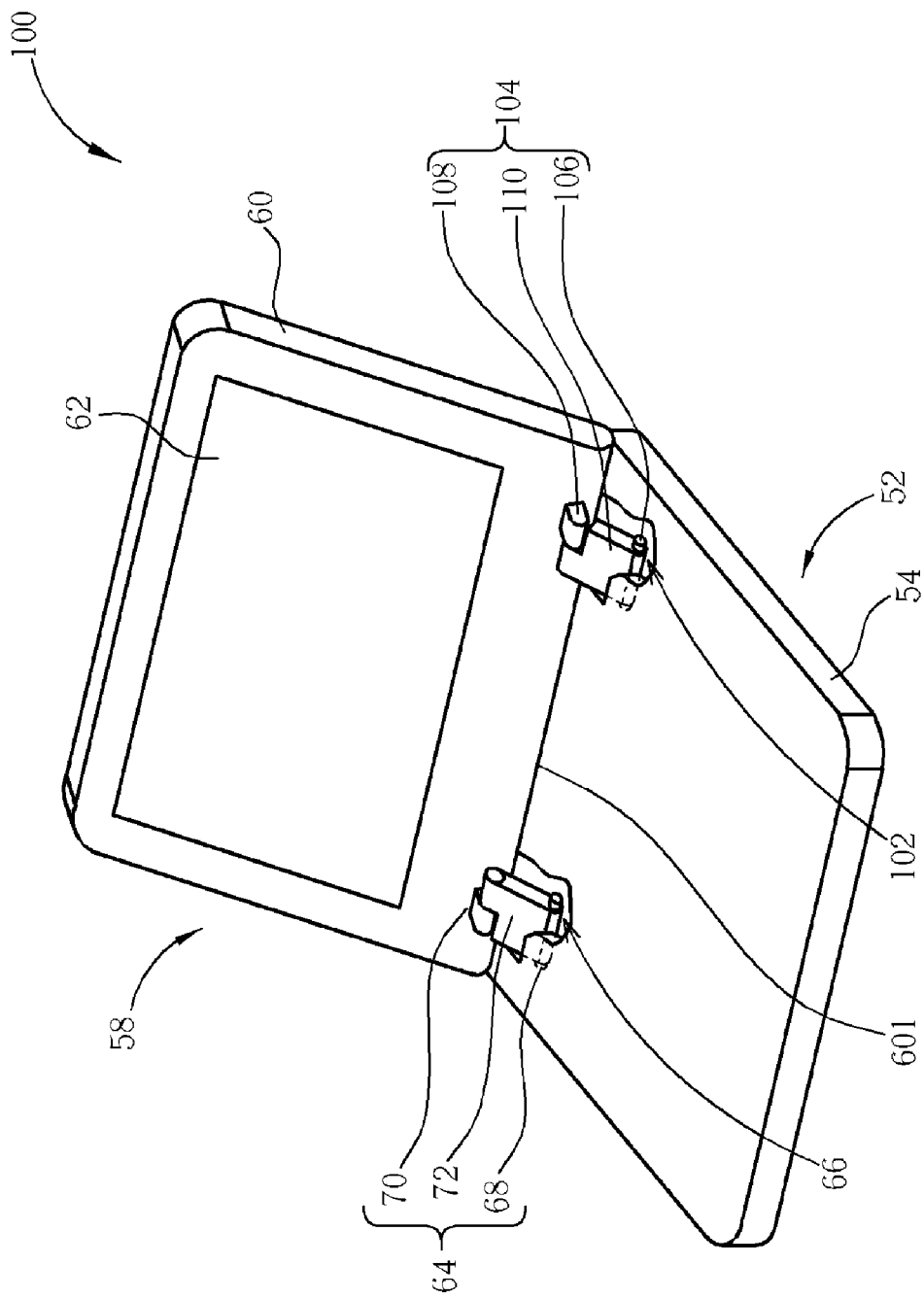
FIG. 6 is a schematic drawing of a portable electronic apparatus according to a second embodiment of the present invention.

Please refer to FIG. 6. FIG. 6 is a schematic drawing of a portable electronic apparatus 100 according to a second embodiment of the present invention. The different between the portable electronic apparatus 100 in the second embodiment and the portable electronic apparatus 50 in the first embodiment is that the portable electronic apparatus 100 further includes a second hinge assembly 104 connected to the first module 52 and the second module 58. The second hinge assembly 104 includes a third hinge 106, a fourth hinge 108, and a second swing member 110. The third hinge 106 is installed inside the first housing 54 and pivotally connected to the first housing 54. The fourth hinge 108 is pivotally connected to the second housing 60. The second swing member 110 is connected to the third hinge 106 and the fourth hinge 108. The first housing 54 further has a second containing space 102. The operation of the portable electronic apparatus 100 is similar with the one of the portable electronic apparatus 50. The first hinge assembly 64 and the second hinge assembly 104 are completely contained inside the first containing space 66 and the second containing space 102 respectively when the first module 52 and the second module 58 are close substantially.

The second hinge 70, the fourth hinge 108, the first swing member 72, and the second swing member 110 are exposed outside the first containing space 66 and the second containing space 102 partly when the second module 58 opens with respect to the first module 52. The rest of the features are essentially the same, thus a further description is hereby omitted. Additionally, the third hinge 106 of the second hinge assembly 104 can be installed inside the second housing 60 and pivotally connected to the second module 58, and the fourth hinge 108 can be pivotally connected to the first housing 54. The operation is the same as the above-mentioned embodiment. The number of the hinge assembly is not limited to the above-mentioned embodiment and depends on demands of design and structural intensity.

In contrast to the conventional portable electronic apparatus, the portable electronic apparatus of the present invention utilizes the invisible dual-axis hinge mechanism for an opening mechanism of the display module with respect to the host module. It can enlarge the view angle of the portable electronic apparatus. The portable electronic apparatus with the invisible hinge mechanism has following disadvantages: uniformity of aesthetic outline, preventing fracture of the hinge when dropping the clamshell mobile phone, small fabricating tolerance causing increase of fabricating precision, and small size of the portable electronic apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic apparatus comprising:
a first module comprising a first housing, the first housing having a first containing space;
a second module comprising a second housing; and
a first hinge assembly connected to the first module and the second module, the first hinge assembly comprising:
a first hinge installed inside the first containing space and pivotally connected to the first module;
a second hinge pivotally connected to the second module; and
a first swing member connected to the first hinge and the second hinge; wherein while the first hinge remains inside the first containing space, the second hinge and the first swing member are exposed outside the first containing space partly when the second module rotates relative to the first module, and the first module and the second module cover the first hinge assembly together when the first module and the second module are closed.

2. The portable electronic apparatus of claim 1, wherein the first module further comprises a host installed inside the first housing for controlling operation of the portable electronic apparatus, and the second module further comprises a screen installed inside the second housing and electrically connected to the host for displaying image signals transmitted from the host.

3. The portable electronic apparatus of claim 1, wherein the first containing space of the first housing is for containing the first hinge assembly.

4. The portable electronic apparatus of claim 3, wherein the first hinge assembly is contained inside the first containing space completely when the first module and the second module are closed.

5. The portable electronic apparatus of claim 3, wherein the second hinge and the first swing member are exposed outside the first containing space partly when the second module is open with respect to the first module.

6. The portable electronic apparatus of claim 1, wherein an end of the second housing of the second module is formed as a fillet structure.

7. The portable electronic apparatus of claim 1 further comprising:

a second hinge assembly connected to the first module and the second module, the second hinge assembly comprising:
a third hinge installed inside the first module and pivotally connected to the first module;
a fourth hinge pivotally connected to the second module; and
a second swing member connected to the third hinge and the fourth hinge;
wherein the first module and the second module cover the second hinge assembly together when the first module and the second module are clow closed.

8. The portable electronic apparatus of claim 7, wherein the first module comprises a first housing, and a host installed inside the first housing for controlling operation of the portable electronic apparatus, and the second module comprises a second housing, and a screen installed inside the second housing and electrically connected to the host for displaying image signals transmitted from the host.

9. The portable electronic apparatus of claim 8, wherein the first housing comprises a second containing space for containing the second hinge assembly.

10. The portable electronic apparatus of claim 9, wherein the second hinge assembly is contained inside the second containing space completely when the first module and the second module are closed.

11. The portable electronic apparatus of claim 9, wherein the fourth hinge and the second swing member are exposed outside the second containing space partly when the second module is open with respect to the first module.

* * * * *